United States Patent
Sethi et al.

(10) Patent No.: US 12,346,958 B2
(45) Date of Patent: Jul. 1, 2025

(54) METHOD AND ARTICLE OF MANUFACTURE FOR AUTOMATED GENERATION OF TITLES AND DESCRIPTIONS FOR ELECTRONIC COMMERCE PRODUCTS

(71) Applicant: Dell Products L.P., Round Rock, TX (US)

(72) Inventors: Parminder Singh Sethi, Ludhiana (IN); Anannya Chowdhury, Jamshedpur (IN)

(73) Assignee: Dell Products L.P., Round Rock, TX (US)

(*) Notice: Subject to any disclaimer, the term of this patent is extended or adjusted under 35 U.S.C. 154(b) by 730 days.

(21) Appl. No.: 16/914,916

(22) Filed: Jun. 29, 2020

(65) Prior Publication Data

US 2021/0406993 A1 Dec. 30, 2021

(51) Int. Cl.
G06Q 30/06 (2023.01)
G06F 16/9535 (2019.01)
G06F 40/56 (2020.01)
G06N 3/049 (2023.01)
G06Q 30/0601 (2023.01)

(52) U.S. Cl.
CPC ..... *G06Q 30/0643* (2013.01); *G06F 16/9535* (2019.01); *G06F 40/56* (2020.01); *G06N 3/049* (2013.01); *G06Q 30/0627* (2013.01)

(58) Field of Classification Search
CPC .................. G06Q 30/06; G06Q 30/0643
See application file for complete search history.

(56) References Cited

U.S. PATENT DOCUMENTS

| 2010/0106703 A1* | 4/2010 | Cramer | G06Q 30/0244 707/706 |
| 2011/0270678 A1* | 11/2011 | Drummond | G06Q 30/0251 707/765 |
| 2015/0161264 A1* | 6/2015 | Schachter | G06F 16/951 707/711 |
| 2017/0076002 A1* | 3/2017 | Dedhia | G06F 16/285 |

(Continued)

FOREIGN PATENT DOCUMENTS

CN 110910884 B * 3/2022 ............. G10L 15/22

OTHER PUBLICATIONS

P. Kontschieder, M. Fiterau, A. Criminisi and S. R. Bulò, "Deep Neural Decision Forests," 2015 IEEE International Conference on Computer Vision (ICCV), Santiago, Chile, 2015, pp. 1467-1475, doi: 10.1109/ICCV.2015.172.*

(Continued)

*Primary Examiner* — Jeffrey A. Smith
*Assistant Examiner* — Jennifer V Lee
(74) *Attorney, Agent, or Firm* — Ryan, Mason & Lewis, LLP

(57) ABSTRACT

A method comprises collecting browsing activity data of at least one user in connection with at least one electronic commerce item, and collecting feature data of the at least one electronic commerce item. In the method, the browsing activity data and the feature data are analyzed using one or more machine learning models. At least one of a title and a description for the at least one electronic commerce item is generated based on the analysis, and are displayed on an interface for viewing by the at least one user.

20 Claims, 10 Drawing Sheets

(56) References Cited

U.S. PATENT DOCUMENTS

2019/0066185 A1* 2/2019 More .................. G06N 7/01
2020/0334734 A1* 10/2020 Al Jadda ............ G06Q 30/0631

OTHER PUBLICATIONS

Zhou, C., Sun, C., Liu, Z., & Lau, F. C. M. Nov. 30, 2015). A C-LSTM neural network for text classification. arXiv.org. (https://arxiv.org/abs/1511.08630#:~:text=C%2DLSTM%20utilizes%20CNN%20to,to%20obtain%20the%20sentence%20representation.).*
Zhou, "A C-LSTM neural network for text classification". (https://arxiv.org/abs/1511.08630# :~:text=C%2DLSTM%20utilizes%20CNN%20to,to%20obtain%20the%20sentence%20representation.) (Nov. 30, 2015).*
Wikipedia, "Click path," https://en.wikipedia.org/w/index.php?title=Click_path&oldid=925903814, Nov. 13, 2019, 5 pages.
M. Rouse, "E-Commerce (electronic commerce)" https://searchcio.techtarget.com/definition/e-commerce#:~:text=E-commerce (electronic commerce) is the buying and selling, or consumer-to-business, accessed Jun. 17, 2020, 9 pages.
Wikipedia, "E-commerce," https://en.wikipedia.org/w/index.php?title=E-commerce&oldid=960846570, Jun. 5, 2020, 17 pages.
P. Kontschieder et al., "Deep Neural Decision Forests," 2015 IEEE International Conference on Computer Vision (ICCV), Santiago, 2015, pp. 1467-1475.

* cited by examiner

| Entry no. | Attributes / Data | Information Source |
|---|---|---|
| 1 | Product or service description, features, attributes | Vendor |
| 2 | User click stream | Browser clicks in cache |
| 3 | User searches and/or keywords from user's previous product/service browsing | Previous searches / browser history in cache |
| 4 | User journey | Browser pages navigation (path followed by user to reach to certain items of interest) in cache |
| 5 | Keyword information from similar product searches | Browser cache |
| 6 | Keyword information from searches performed by user on different platform using same email or login id | Information from different platform cache (e.g., Desktop/mobile/tablet/etc.) Used to search products using same email or login id |
| 7 | Status information of similar product searches (bought/ saved in cart/ left in cart) | Browser history and site history |
| 8 | Site searches and history | Browser cache |

FIG. 3

| Layers in Machine Learning Network | Description |
| --- | --- |
| Layer 1 (input layer) | Initialization when a new description / keyword / message is sent as input to the learning engine. |
| Layer 2 (transient input layer) | Recorded user activity data is sent as input to the learning engine. |
| Layer 3 (AC-LSTM model) | This is a model embedded within the deep network where the feature data, user activity data and other inputs are broken down (tokenized) and filtered from the articles/vowels, stop words and then the most used words or the key tokens are rooted. |
| Layer 4 (coupled neurons) | Selected inference rules come as black-box input from a database (as they are already residing within learning engine and have a static definition) and a ratio matrix is defined in which each keyword is assigned a ratio against the most used keywords, related keywords and essential keywords (decided based on feature data). |
| Layer 5 (densely connected neurons for max pooling) | Add a new map/reduce task to scrape keywords and generate sentence sequences based on the output from the ratio matrix creation layer. |
| Layer 6 (decoupled neurons → error backpropagation) | Trace and highlight grammatical errors in the key sequences and regenerate these phrases. |
| Layer 7 (truncated backpropagation using ReLu optimization) | Similarity matching of generated title or description sentence with predicted user intent and future browsing activity, and with actual product or service description using hierarchy gradient flow. |
| Layer 8 (forward pass layer or the blind merge layer) | Task reconstruction layer to generate the final title or description metadata. |
| Layer 9 (output layer) | Save checkpoint (saves space and time of next fetch) in database along with high ratio keywords and clear task resources |

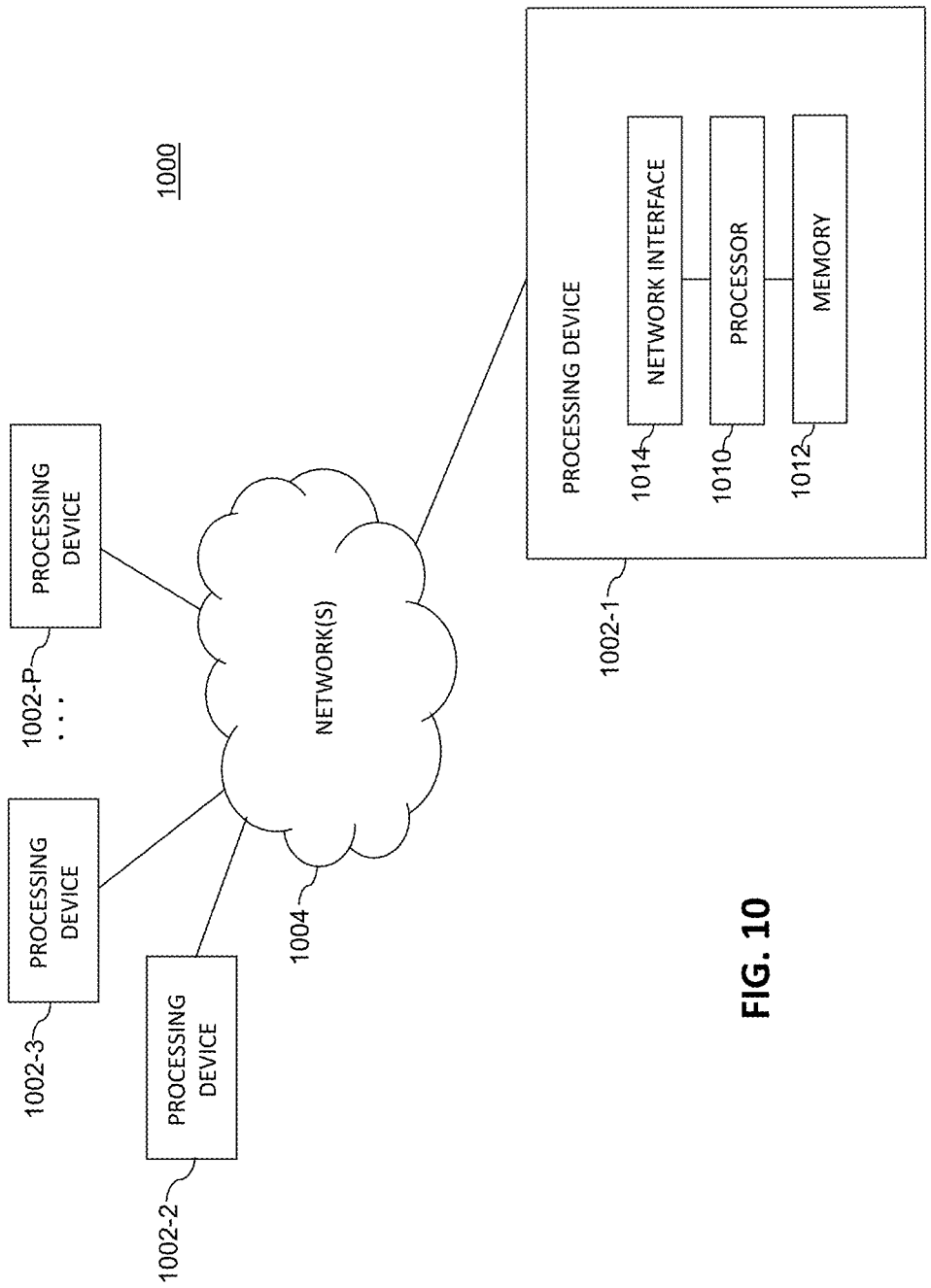

METHOD AND ARTICLE OF MANUFACTURE FOR AUTOMATED GENERATION OF TITLES AND DESCRIPTIONS FOR ELECTRONIC COMMERCE PRODUCTS

FIELD

The field relates generally to information processing systems, and more particularly to generation of product titles and descriptions in online retail information processing systems.

BACKGROUND

Users searching for products online typically include their product requirements in the search terms and may perform their searches on different websites by inputting different specifications, queries and keywords. However, due to limitations of conventional techniques for responding to user queries and listing product search results, users are often overwhelmed by the number of search results, which do not have the product features that the users want.

For example, existing solutions for product title and description generation for online retail websites are rigid, cumbersome and time consuming. The current methods require template-based formatting of titles and descriptions, which does not allow much opportunity for modifications. The template-based methods require technical content writers, vendors, etc., to develop short titles and descriptions in limited space that may not convey to users the information they might need when shopping for a product. As a result, fixed template-based titles and descriptions typically do not include effective words or phrases that will adequately assist users when browsing for a product, and fail to cater to different customers having different needs.

SUMMARY

Illustrative embodiments provide techniques for automatically populating results and automatically generating unique and meaningful product titles and descriptions tailored to a user's search criteria.

In one embodiment, a method comprises collecting browsing activity data of at least one user in connection with at least one electronic commerce item, and collecting feature data of the at least one electronic commerce item. In the method, the browsing activity data and the feature data are analyzed using one or more machine learning models. At least one of a title and a description for the at least one electronic commerce item is generated based on the analysis and is displayed on an interface for viewing by the at least one user.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts a table including details of attributes and/or data collected from different product vendors or other sources according to an illustrative embodiment.

FIG. 5 depicts a table including details of layers in a machine learning model according to an illustrative embodiment.

FIGS. 7A, 7B, 7C and 7D depict different word clouds generated for different users according to an illustrative embodiment.

FIGS. 9 and 10 show examples of processing platforms that may be utilized to implement at least a portion of an information processing system according to illustrative embodiments.

DETAILED DESCRIPTION

Figure 1:
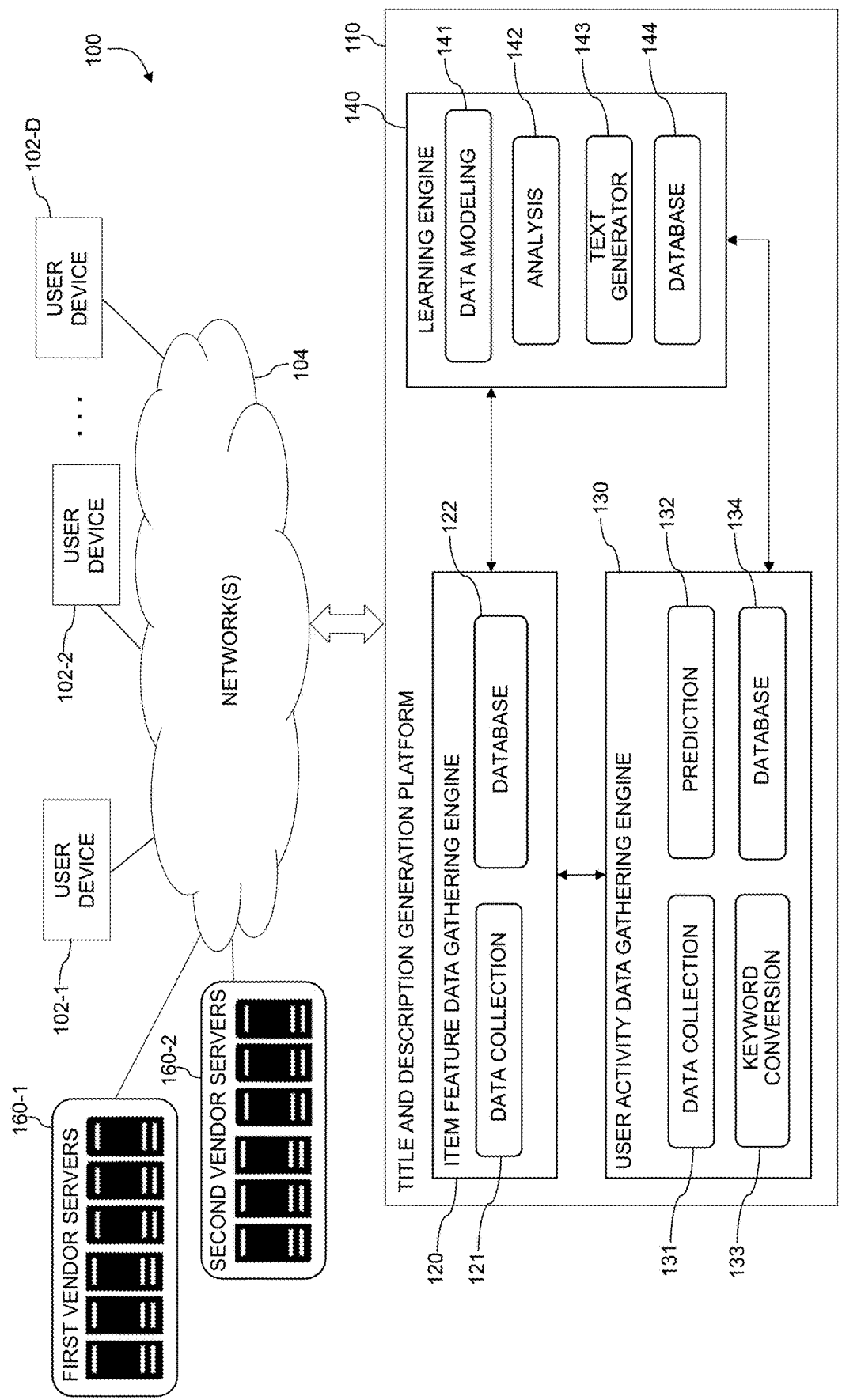
FIG. 1 depicts details of an information processing system with a title and description generation platform for automatically generating unique and meaningful product titles and descriptions according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "server" refers to a device configured to provide functionality (e.g., applications, tasks and services) for programs or devices, which can be referred to as "users" or "clients." Servers provide various functionalities for clients or users, including, but not necessarily limited to, hosting web pages, cataloging network data, storing data, implementing communications, performing computations, sharing files, processing electronic mail, providing gaming services, providing streaming services and providing virtualization services.

As used herein, "electronic commerce" or "e-commerce" refers to buying and/or selling of items, such as products or services, over a network, such as the Internet, or other type of network. Users typically access one or more online platforms, such as websites, to search for items and complete an e-commerce transaction, such as a purchase or sale of an item online. In a non-limiting example, e-commerce may include online shopping for retail products by consumers via websites and/or mobile applications.

As used herein, a "vendor" refers to an e-commerce provider, such as, for example, an entity providing a platform for the buying and selling of products and/or services online. Some examples of vendors include, but are not necessarily limited to, Amazon®, eBay®, Google®, Dell® and Walmart®.

As used herein, "natural language processing (NLP)" can refer to interactions between computers and human (natural) languages, where computers are able to derive meaning from human or natural language input, and respond to requests and/or commands provided by a human using natural language.

As used herein, "natural language understanding (NLU)" can refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

In an illustrative embodiment, machine learning techniques are used to analyze users' past and/or current browsing and searches for product features to generate titles and descriptions in online search results that attract the users' attention towards the products. One or more embodiments utilize a deep neural forest network algorithm to read user statistics, user browsing history and trends generated from behavior of the user in online retail scenarios to populate query results based on the user's data. Using text pattern modelling, matching and generation techniques, the embodiments generate titles and/or descriptions for products based on the products' features and the analyzed user data. The algorithm will generate different titles and descriptions for the same product for different users based on each user's data.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a title and description generation platform 110.

The user devices 102 can comprise, for example, Internet of Things (IoT) devices, desktop, laptop or tablet computers, mobile telephones, or other types of processing devices capable of communicating with the title and description generation platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as J, K, L, P and T are assumed to be arbitrary positive integers greater than or equal to two.

The terms "client" or "user" herein are intended to be broadly construed so as to encompass numerous arrangements of human, hardware, software or firmware entities, as well as combinations of such entities. Title and description generation services may be provided for users utilizing one or more machine learning models, although it is to be appreciated that other types of infrastructure arrangements could be used. At least a portion of the available services and functionalities provided by the title and description generation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the title and description generation platform 110, as well as to support communication between the title and description generation platform 110 and connected devices (e.g., user devices 102) and/or other related systems and devices not explicitly shown.

In some embodiments, the user devices 102 are assumed to be associated with repair technicians, system administrators, information technology (IT) managers, software developers, release management personnel or other authorized personnel configured to access and utilize the title and description generation platform 110.

The information processing system 100 further includes first vendor servers 160-1 and second vendor servers 160-2 (collectively "vendor servers 160") connected to the user devices 102 and to the title and description generation platform 110 via the network 104. Although servers from first and second vendors 160-1 and 160-2 are shown in FIG. 1, the embodiments are not necessarily limited thereto, and more or less than two vendors can be part of the information processing system 100. The vendors include, for example, e-commerce vendors as described herein, which maintain one or more servers to support their online e-commerce platforms. The vendor servers store data associated with users of their platforms, as well as data associated with products and/or services being offered on their platforms. As described further herein, vendor servers store user browsing activity data, which includes, for example, navigation paths (e.g., click paths) of users of the e-commerce sites when navigating to find an e-commerce item, searches performed by the users for e-commerce items, keywords used by the users in the searches, and purchase status data (e.g., whether a sale for an item is pending or completed) for e-commerce items. Vendor servers also store feature data for the products and/or services offered on their platforms. The feature data can include, for example, titles, descriptions and attributes of the e-commerce items as presented on the vendor's e-commerce sites. For example, the feature data includes the titles, descriptions and attributes of the e-commerce items that are used by the vendors when offering their products or services for sale on their platforms. The sources of the browsing activity data and the feature data are not necessarily limited to the vendor servers 160 and also include, for example, user devices 102, and more specifically, caches for web browsers on the user devices 102 that store user browsing history.

The title and description generation platform 110 in the present embodiment is assumed to be accessible to the user devices 102, and vice-versa, over the network 104. In addition, the title and description generation platform 110 and the user devices 102 can access the vendor servers 160 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments, therefore, comprises combinations of multiple different types of networks, each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The title and description generation platform 110, on behalf of respective infrastructure tenants each corresponding to one or more users associated with respective ones of the user devices 102, provides a platform for automatically generating product titles and descriptions in search results, which are tailored to each user.

Referring to FIG. 1, the title and description generation platform 110 comprises an item feature data gathering engine 120, a user activity data gathering engine 130, and a learning engine 140. The item feature data gathering engine 120 includes a data collection component 121 and a database 122. The user activity data gathering engine 130 includes a data collection component 131, a prediction component 132, a keyword conversion component 133 and a database 134. The learning engine 140 includes a data modeling component 141, an analysis component 142, a text generator 143 and a database 144.

When using conventional techniques, given a search query by a user for a particular product, the results given by different vendor websites include pre-written template-based titles and descriptions, which often do not match the search criteria of the user. The non-matching results may also be due to a failure of current approaches to perform an accurate text analysis on the user's query, resulting in results that fail to cater to a user's interest.

Figure 2:
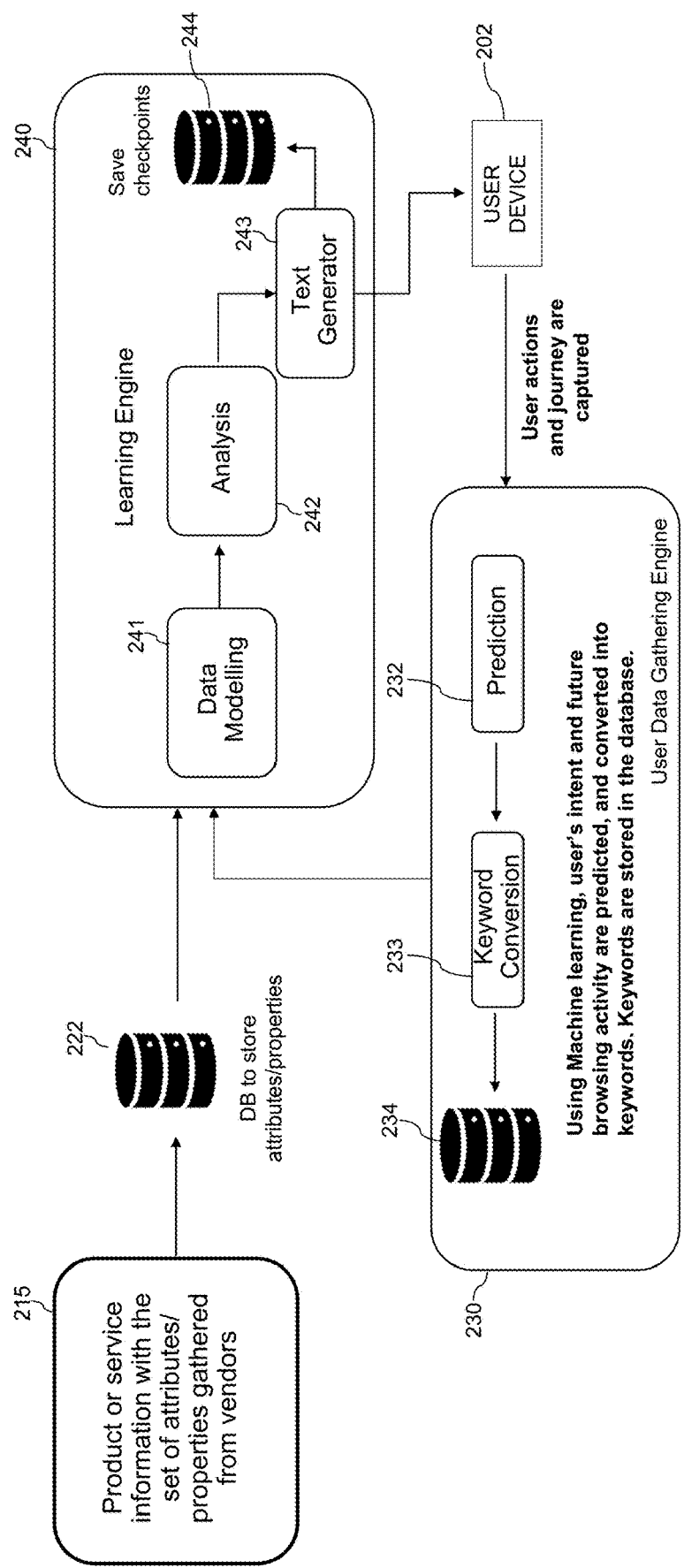
FIG. 2 depicts details of an operational flow for automatically generating unique and meaningful product titles and descriptions tailored to a user's search criteria and historical data according to an illustrative embodiment.

Referring to the system 100 in FIG. 1, and to the operational flow 200 in FIG. 2, according to one or more embodiments, when given a search query by a user, the learning engine 140/240 uses one or more machine learning models to analyze item feature data and user activity data to provide search results that include, in the titles and/or descriptions of the found products or services, the requirements and/or features specified by the user in the query. Where appropriate and relevant, the learning engine 140 automatically populates the titles and/or description in the search results with keywords from a user's current query or based on past user browsing activity so that a user is more likely to be interested in and understand the search results. The titles and/or descriptions are displayed on an interface for viewing by a user.

Referring to FIGS. 1 and 2, at block 215, using the data collection component 121, the item feature data gathering engine 120 collects product or service information including attributes and/or properties of products or services from the vendor servers 160, and stores the collected data in a database 122/222. According to an embodiment, using NLP and NLU techniques, the data collection component 121 determines which product and/or service information to collect based on an incoming query for which a title and/or description are to be generated. For example, the data collection component 121 compares an incoming query to product/service offerings of a vendor for matching products and/or services to determine which product and/or service information to collect from a vendor. Referring to the table 300 in FIG. 3, item feature data such as product or service descriptions, features and attributes used by vendors in connection with offerings on their e-commerce sites are collected from the vendor servers 160.

Using the data collection component 131, the user activity data gathering engine 130 collects browser activity data including, for example, user actions and journey, from user devices 102/202, and stores the collected data in a database 134/234. As shown in the table 300, user browsing activity includes, for example, user click paths (e.g., clickstreams) collected from browser caches on user devices 102/202. Click path or clickstream data includes the sequence of hyperlinks followed by users on a given website in connection with current/incoming (e.g., real-time) queries and/or previous queries. The browsing activity data also includes user searches and/or keywords for products/services corresponding to browsing sessions performed prior to a current (e.g., real-time) browsing session for a particular product or service, which can be retrieved from previous search and/or browser history in caches on user devices 102/202. User journey data comprises data on webpages visited by a user to reach items of interest, which can also be retrieved from caches on user devices 102/202. The user browsing activity data further includes keyword information from similar product searches and keyword information from searches performed by a user on different platforms using the same email or login identifier, which are available on user device caches. For each of the user activity data categories, the user devices 102/202 can be devices running on different platforms, such as, for example, desktop, smartphone, tablet, etc. User browsing activity data that can be retrieved from browser and website history in a user device cache or from a vendor server includes status information following previous user searches for products/services that are similar to products/services that are the subject of a current (e.g., real-time) search. The status information includes information on whether a product or service was purchased, saved for later purchase or was added to a virtual shopping cart but never purchased. User browsing activity data also can include website searches and history retrieved from a browser cache that may not necessarily include searches for a specific product or service to buy. For example, the searches and history may relate to articles or commentary that may correspond to a product or service or the features thereof. According to an embodiment, using NLP and NLU techniques, the data collection component 131 determines whether historical browsing activity is relevant to an incoming query and collects the related historical user browsing activity data from the user data sources described herein.

A prediction component 132/232 of the user activity data gathering engine 130 uses one or more machine learning techniques to predict user intent and future browsing activity based on the collected user browsing activity. The predicted user intent and/or future browsing activity includes, for example, searches a user may perform, products/services and product/service features in which a user may be interested. A keyword conversion component 133/233 converts the predicted user intent and predicted future browsing activity into keywords, which are stored in the database 134/234.

The item feature data from the database 122/222 and the user browsing activity data and keywords from the database 134/234 are provided to the learning engine 140/240, where the analysis component 142/242 analyzes the browsing activity data, the feature data and the keywords using one or more machine learning models. The one or more machine learning models are trained and developed by the data modeling component 141/241. A machine learning model in an embodiment uses cleaned and transformed data for training. Before the model is trained, pre-requisite steps may include data pre-processing, mean subtraction and data normalization. The transformed and staged data is pushed into the learning model. The model is trained with, for example, tags from product or service features, user history and sentences with listed requirements.

Based on the analysis, a text generator 143/243 generates titles and/or descriptions for electronic commerce items in search result to an incoming query. The generated titles and/or descriptions are based on what the analysis component 142/242 concludes to be user's intent from the received item feature data, user activity data and/or keywords. The text generator 143/243 uses text pattern modelling, text pattern matching, text generation and/or other NLP and NLU techniques, to generate the titles and/or descriptions. More specifically, the text generator 143/243, with the data modeling component 141/241 determines textual patterns in the browsing activity data, the feature data and the keywords, as well as in the incoming query, and identifies similarities between the determined textual patterns. The text generator 143/243 uses the identified similarities to generate the sentences and/or phrases for the titles and/or descriptions.

According to an embodiment, the analysis component 142/242 utilizes a deep neural forest network algorithm to read user browsing activity data including, but not necessarily limited to, statistics, user journey data, and trends generated from user behavior. The text generator 143/243 automatically populates search results based on conclusions about a user's telemetry output by the analysis component 142/242 by generating a title and/or description for a product or service. The title and/or description is further based on the feature data of the product/service for which the title and/or description is being generated. The algorithm is capable of generating different titles and descriptions as and when required for different users based on the users' different telemetry data.

According to an embodiment, the deep neural forest network is embedded with a C-LSTM network, such as an artificial convolutional attention neural network (e.g., attention convolutional long short-term memory (AC-LSTM) network) to take as input the browsing activity data, the feature data and/or the keywords, and remove stop words from the data that may be ignored without sacrificing the meaning of a sentence. The deep neural forest network tokenizes and stems the most frequently used keywords in the data and predicts keywords corresponding to statements about a product's/service's actual features derived from the feature data.

The deep neural forest network is used by the text generator 143/243 to generate sequences of the predicted keywords and correct grammar of the generated sequences in order to generate an appropriate title and/or description. The deep neural forest network performs a query to context operation and/or context to query operation based on user statistics, actual product descriptions, user journeys and trends using the AC-LSTM model to generate the title and/or description. According to an embodiment, the generated title and/or description for a user comprises one or more keywords used by the user in the one or more of their searches for the product or service, or for a similar product or service.

According to an embodiment, the data modeling component 141/241 determines keywords most frequently used in titles and/or descriptions generated by the text generator 143/243, creates a plurality of checkpoints for the most frequently used keywords, and re-trains the one or more machine learning models using the created plurality of checkpoints. The keywords and checkpoints are saved in the database 144/244. The checkpoints are retrieved from the database 144/244 and used for retraining the one or more machine learning models used by the analysis component 142/242.

Machine learning models such as, for example, deep learning models, may take hours, days or even weeks to train. If the execution of the machine learning model unexpectedly stops, all the previous training can be lost. Checkpointing provides a fault tolerance technique for long running machine learning processes. A checkpoint comprises a snapshot of the state of a system, which is taken in case of system failure. The checkpoint may be used directly or used as the starting point for a new execution, picking up where it left off prior to failure. A checkpoint functions like an auto-save for a machine learning model in case training is interrupted for any reason. Checkpoints may be considered the weights of a model, the weights being used to make predictions as is or used as the basis for ongoing training.

According to an embodiment, checkpoints allow specification of which metric to monitor, such as loss or accuracy of the training or validation dataset. Key performance indicators (KPIs) can specify whether to look for an improvement in maximizing or minimizing a score. A file name to store checkpoints can include variables such as, for example, an epoch number or metric. In an embodiment, a checkpoint strategy saves model weights to the same file, if and only if the validation accuracy improves.

In accordance with one or more embodiments, checkpoints allow use of a pre-trained model for inference without having to retrain the model, and provide for resumption of a training process from where it left off in case the training process was interrupted or a model needs to be fine-tuned.

The steps for saving and loading model and weights using checkpoints include, for example, creating a base model architecture with a loss function, metrics, and an optimizer, specifying the path where saving of the checkpoint files will be performed, creating a callback function to save the model, applying the callback function during the training, evaluating the model on test data, and loading the pre-trained weights on a new model using load_weights( ) or restoring the weights from the latest checkpoint.

Over time, the one or more machine learning models identify patterns based on the extracted keywords and the checkpoints stored in the database 144/244 to learn the behavior, trends, search activity and product preferences for different users. Referring to FIGS. 7A, 7B, 7C and 7D, the learning engine 140/240 generates word clouds 705, 710, 715 and 720 based on the identified patterns for respective users. The word clouds 705, 710, 715 and 720 comprise the keywords found in the database 144/244, and are specific to each user based on their user activity data and conclusions drawn by the learning engine 140/240 from the user activity data.

For example, in response to searches for products and/or services performed by multiple users, browsing activity data for the multiple users is collected and analyzed in order to generate titles and/or descriptions for items in their respective search results. Overtime, the keywords used in the search results for the multiple users are stored in the database 144/244 and compiled for each user to generate respective word clouds for each user. The word clouds, such as word clouds 705, 710, 715 and 720 can be used by the learning engine 140/240 to identify individual user trends and as reference for keywords when generating new titles and/or descriptions.

Figure 4:
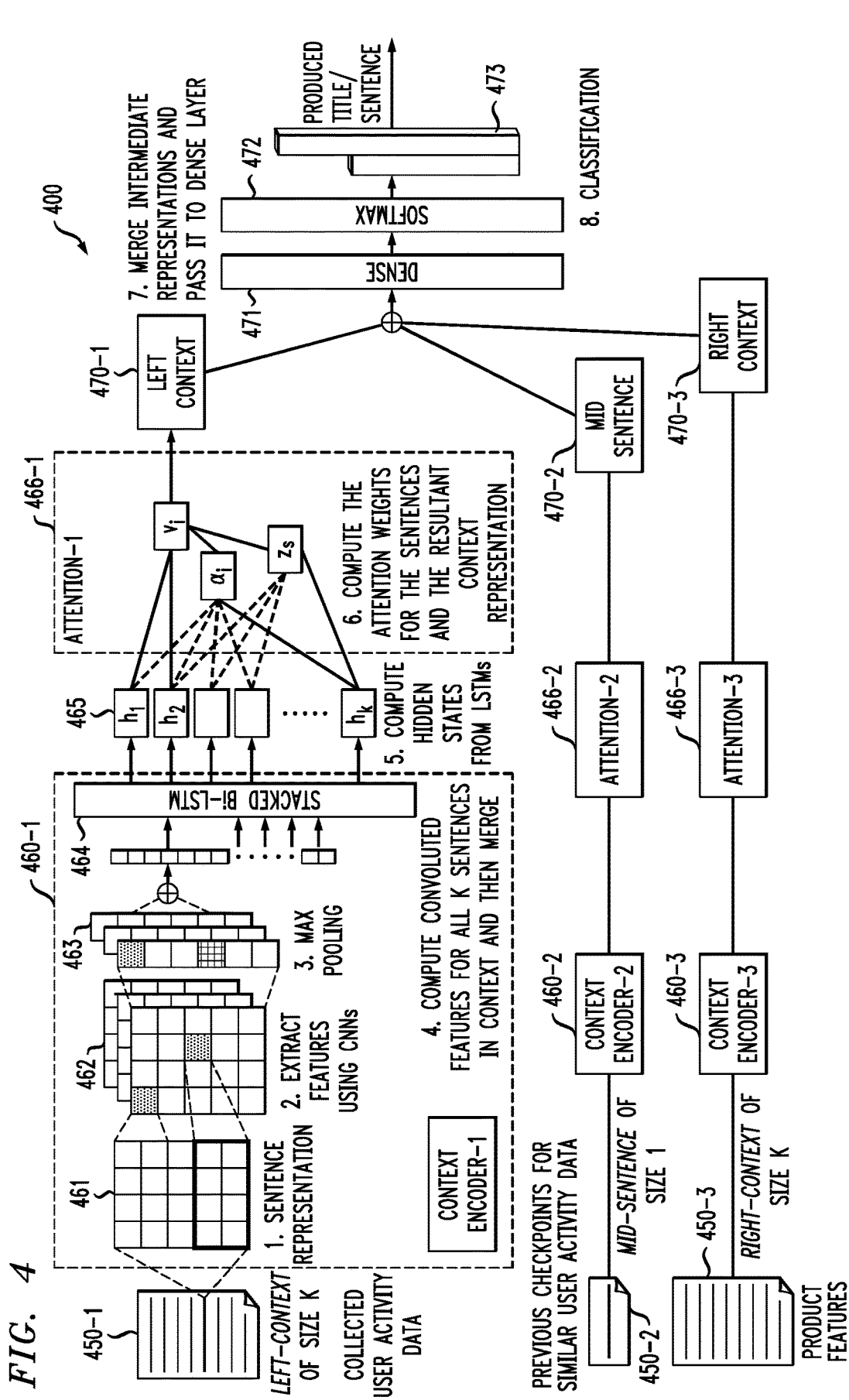
FIG. 4 depicts an operational flow for analysis and text generation performed by a learning engine according to an illustrative embodiment.

FIG. 4 depicts an operational flow 400 for analysis and text generation performed by the learning engine 140/240 according to an illustrative embodiment. Referring to FIG. 4, collected user activity data 450-1 (e.g., from database 134/234), previous checkpoints for similar user activity data 450-2 (e.g., from database 144/244) and product (or service) feature data 450-3 (e.g., from database 122/222) are input to respective context encoder-1 460-1, context encoder-2 460-2 and context encoder 460-3 (collectively "context encoders 460") as left-context having k sentences, mid-sentence having 1 sentence (k=1) and right-context of having k sentences. Each of the context encoders 460 generates a sentence representation 461 from their respective inputs 450-1, 450-2 and 450-3, extracts features from the sentence representations 461 using convolutional neural networks (CNNs) 462, performs max-pooling 463, computes convoluted features for all k sentences in the context (left, mid or right) and then merges the convoluted features in a stacked bi-directional long short-term memory (Bi-LSTM) network 464. At element 465, hidden states are computed from the LSTM outputs from the context encoders 460. Taking the computed hidden states as inputs, respective attention-1, attention-2 and attention-3 components 466-1, 466-2 and 466-3 (collectively "attention components 466") compute the attention weights for the sentences and the resultant context representation. A left context 470-1, a mid-sentence 470-2 and a right context 470-3 are respectively output from the attention-1, attention-2 and attention-3 components 466. The intermediate representations 470-1, 470-2 and 470-3 are merged and passed on to a dense layer 471, whose output is classified in a softmax layer 472. The resulting automatically generated title and/or description sentence 473 to be used in the search result is output from the softmax layer 472.

According to one or more embodiments, the learning engine 140/240 uses LSTM, attention networks and convolutional networks. An LSTM comprising three gates (input, forget, and output gates) is used and calculates the hidden state through a combination of the three gates. The inputs are sent as one-hot encodings coupled with abstract representations constructed by the convoluted model. In order to perform sentence modeling on these one-hot encodings with a C-LSTM network, sentences are tokenized into words, which are further transformed into a word embedding matrix (e.g., input embedding layer) of h dimension hidden layers. Convolutional filters are applied on the input embedding layer by applying a filter of all possible window sizes to produce a feature map. This is then followed by a max-pooling operation 463 which applies a max operation on each filter to obtain a fixed length output and reduce the dimensionality of the output.

Attention mechanisms are added for text summarization and translation for sentence generation. Essentially, the attention mechanism is derived from the need to allow a decoder part of the AC-LSTM-based framework to use the last hidden state along with information (i.e., context vector) calculated based on the input hidden state sequence. This is particularly beneficial for tasks that require some alignment to occur between the input and output text. These attention layers are saved as model checkpoints as they carry weights and true feature segmentation from sentences as the context. Following the generation of the sentence context, the dense layer 471 regularizes and combines the contexts to form a sentence so that the title and/or description sentence 473 can be produced.

FIG. 5 depicts a table 500 including details of layers in a machine learning network according to an illustrative embodiment. Referring to FIG. 5, a first layer of the machine learning network comprises an input layer where a new description, keyword and/or message is sent as input to the learning engine 140/240. A second layer comprises a transient input layer where recorded user activity data is sent as input to the learning engine 140/240. The third layer is the AC-LSTM model which, as described herein, is embedded within the deep neural network. The AC-LSTM model is where the feature data, user activity data and other inputs are broken down (tokenized) and filtered from articles/vowels and stop words, and then the most used words and/or the key tokens are rooted. The fourth layer comprises coupled neurons, where selected inference rules come as black-box input from a database. The inference rules already reside within the learning engine 140/240 and have a static definition. In the fourth layer, a ratio matrix is defined in which each keyword is assigned a ratio against the most used keywords, related keywords and essential keywords, which are decided based on feature data. The fifth layer comprises densely connected neurons for max pooling, where new map/reduce tasks are added to scrape keywords and generate sentence sequences based on the output from the fourth layer where the ratio matrix was created. In the sixth layer, error backpropagation is performed on decoupled neurons. More specifically, grammatical errors in the keyword sequences are highlighted and traced, and these phrases are regenerated. In the seventh layer, truncated backpropagation using rectified linear unit (ReLu) optimization is performed, which includes similarity matching of generated title or description sentences with predicted user intent and future browsing activity, and with an actual product or service description using hierarchy gradient flow. In the eighth layer, which is a forward pass or blind merge layer, task reconstruction is performed to generate final title or description metadata. In the ninth layer, which is an output layer, checkpoints are saved in a database (e.g., database 144/244) along with high ratio keywords and clear task resources.

Figure 6:
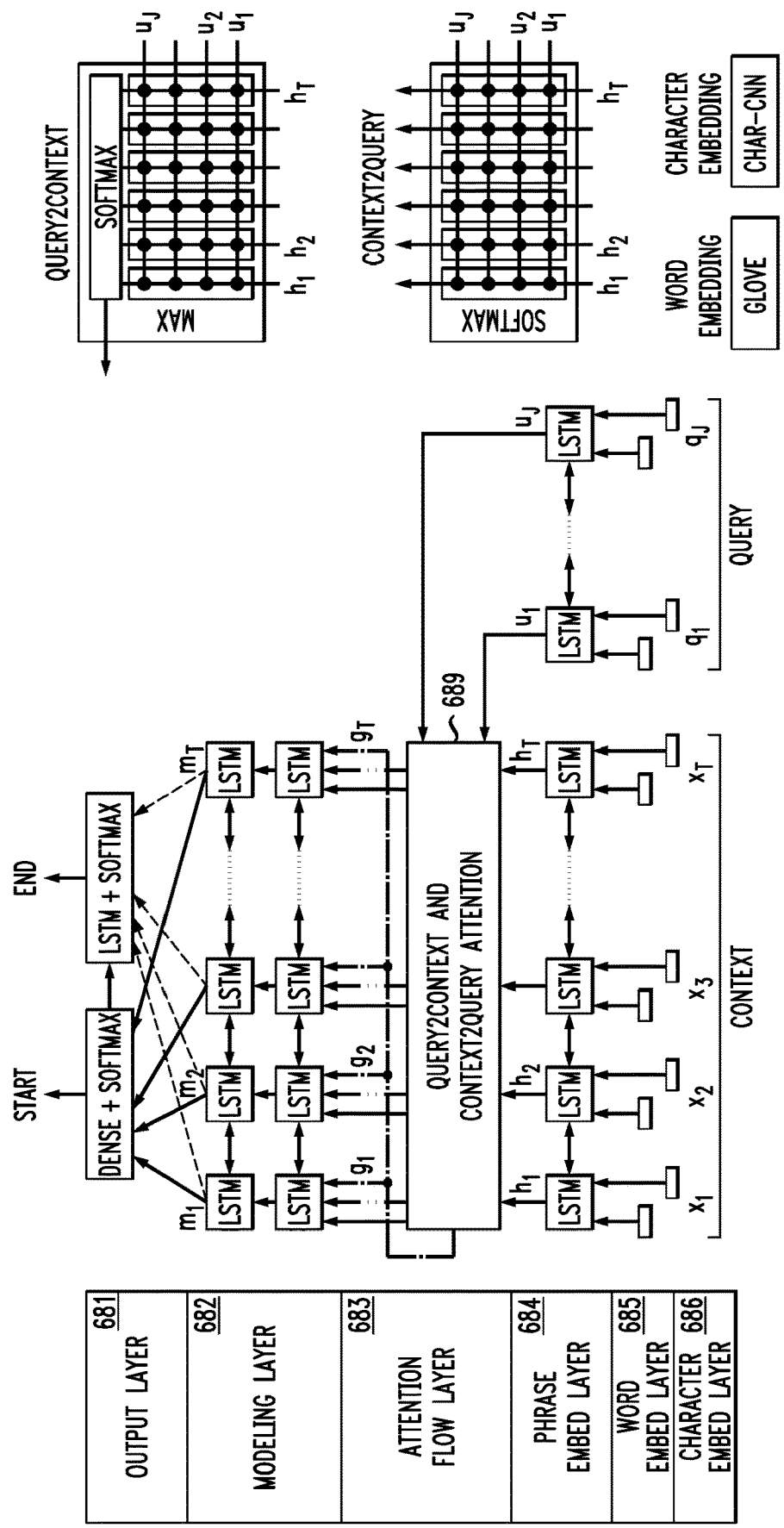
FIG. 6 is a block diagram illustrating convolutional long short-term memory (C-LSTM) network used by a learning engine according to an illustrative embodiment.

FIG. 6 is a block diagram illustrating C-LSTM network 600 used by the learning engine 140/240 according to an illustrative embodiment. The C-LSTM network 600 comprises an output layer 681, modeling layer 682, attention flow layer 683, phrase embedding layer 684, word embedding layer 685 and a character embedding layer 686. The network 600 comprises an attention network model capable of parallel computation and effectively modeling both long- and short-term dependencies. The network 600 calculates dependencies between representations without considering contextual information, which is useful for modeling dependencies among neural representations in various natural language tasks. To maintain the simplicity and flexibility of self-attention networks, the network 600 contextualizes the transformations of the query and key layers, which are used to calculate the relevance between elements. Specifically, internal representations that embed both global and deep contexts are leveraged, thus avoiding reliance on external resources.

The query concepts come from retrieval systems. For example, when a user types a query to search for some product, a search engine will map the query against a set of keys (product tags, description, etc.) associated with candidate products in a database and present the user with the best matched values.

The network 600 is a closed-domain, extractive model which means that to be able to answer a query, the model must consult an accompanying text that contains the information needed to answer the query. This accompanying text is called the context. The model works by extracting a substring of the context that best answers the query. The user provides a query which is tokenized, stemmed, and turned into a character embedded layer 686 as context. With the help of these contexts, word embedding and phrase generation are performed by the phrase and word embedding layers 684 and 685 to turn the context to a query answer (e.g., description and/or title) for the product (or service).

According to one or more embodiments, the databases 122/222, 134/234, 144/244 used by the title and description generation platform 110 can be configured according to a relational database management system (RDBMS) (e.g., PostgreSQL). Databases 122/222, 134/234, 144/244 in some embodiments are implemented using one or more storage systems or devices associated with the title and description generation platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the title and description generation platform 110, the item feature data gathering engine 120, the user activity data gathering engine 130, and the learning engine 140 in other embodiments can be implemented at least in part externally to the title and description generation platform 110, for example, as stand-alone servers, sets of servers or other types of systems coupled to the network 104. For example, the item feature data gathering engine 120, the user activity data gathering engine 130, and the learning engine 140 may be provided as cloud services accessible by the title and description generation platform 110.

The item feature data gathering engine 120, the user activity data gathering engine 130, and/or the learning engine 140 in the FIG. 1 embodiment are each assumed to be implemented using at least one processing device. Each such processing device generally comprises at least one processor and an associated memory, and implements one or more functional modules for controlling certain features of the item feature data gathering engine 120, the user activity data gathering engine 130, and/or the learning engine 140.

At least portions of the title and description generation platform 110 and the components thereof may be implemented at least in part in the form of software that is stored in memory and executed by a processor. The title and description generation platform 110 and the components thereof comprise further hardware and software required for running the title and description generation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the item feature data gathering engine 120, the user activity data gathering engine 130, the learning engine 140 and other components of the title and description generation platform 110 in the present embodiment are shown as part of the title and description generation platform 110, at least a portion of the item feature data gathering engine 120, the user activity data gathering engine 130, the learning engine 140 and other components of the title and description generation platform 110 in other embodiments may be implemented on one or more other processing platforms that are accessible to the title and description generation platform 110 over one or more networks. Such components can each be implemented at least in part within another system element or at least in part utilizing one or more stand-alone components coupled to the network 104.

It is assumed that the title and description generation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the item feature data gathering engine 120, the user activity data gathering engine 130, the learning engine 140 and other components of the title and description generation platform 110, and the elements thereof can each be implemented in the form of one or more LXCs running on one or more VMs. Other arrangements of one or more processing devices of a processing platform can be used to implement the item feature data gathering engine 120, the user activity data gathering engine 130 and the learning engine 140, as well as other components of the title and description generation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the title and description generation platform 110 to reside in different data centers. Numerous other distributed implementations of the title and description generation platform 110 are possible.

Accordingly, one or each of the item feature data gathering engine 120, the user activity data gathering engine 130, the learning engine 140 and other components of the title and description generation platform 110 can each be implemented in a distributed manner so as to comprise a plurality of distributed components implemented on respective ones of a plurality of compute nodes of the title and description generation platform 110.

It is to be appreciated that these and other features of illustrative embodiments are presented by way of example only, and should not be construed as limiting in any way.

Accordingly, different numbers, types and arrangements of system components such as the item feature data gathering engine 120, the user activity data gathering engine 130, the learning engine 140 and other components of the title and description generation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the title and description generation platform can be offered to cloud infrastructure customers or other users as part of FaaS, CaaS and/or PaaS offerings.

Figure 8:
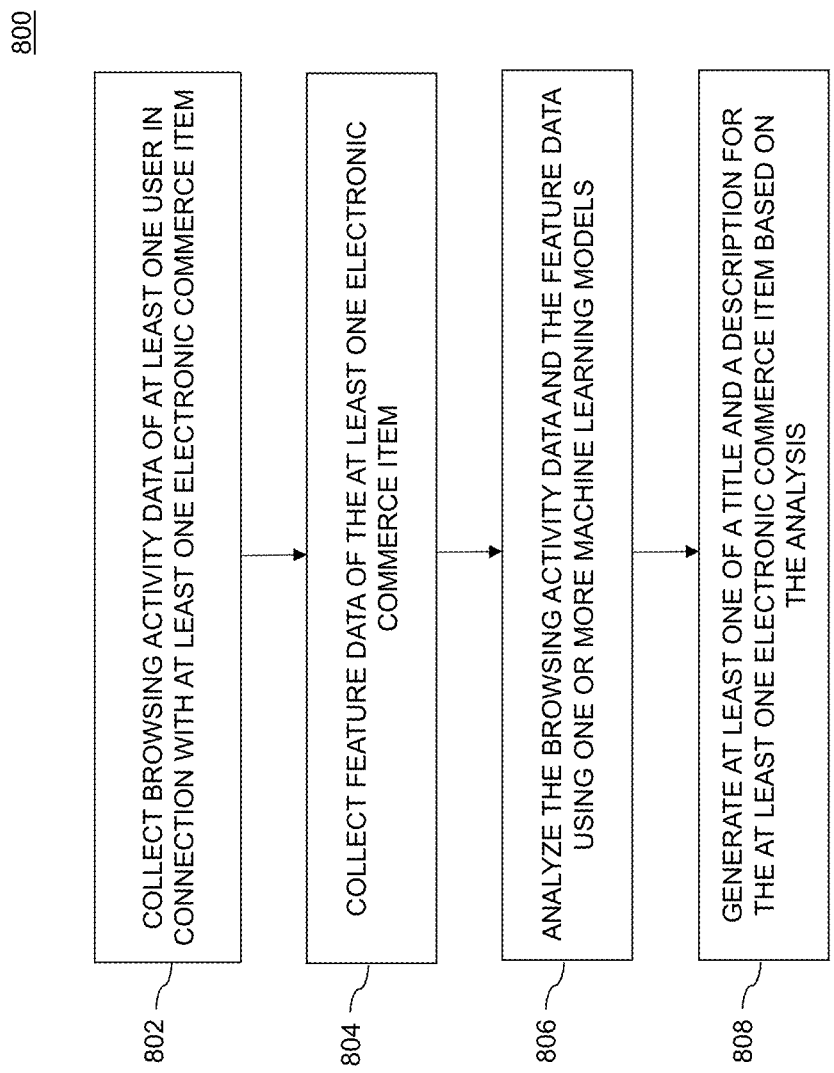
FIG. 8 depicts a process for automatically generating unique and meaningful product titles and descriptions according to an illustrative embodiment.

The operation of the information processing system 100 will now be described in further detail with reference to the flow diagram of FIG. 8. With reference to FIG. 8, a process 800 for automatically generating unique and meaningful product titles and descriptions as shown includes steps 802 through 808, and is suitable for use in the system 100 but is more generally applicable to other types of information processing systems comprising a title and description generation platform configured for automatically generating unique and meaningful product titles and descriptions.

In step 802, browsing activity data of at least one user in connection with at least one electronic commerce item is collected. In step 804, feature data of the at least one electronic commerce item is collected. The browsing activity data and the feature data are collected from a cache of a user device of the at least one user and/or one or more servers corresponding to one or more vendors of the at least one electronic commerce item.

The browsing activity data comprises one or more navigation paths of the at least one user, one or more searches performed by the at least one user for the at least one electronic commerce item, one or more keywords used by the at least one user in the one or more searches, and/or purchase status data for the at least one electronic commerce item. The generated title and/or the generated description may comprise the one or more keywords used by the at least one user in the one or more searches.

The feature data comprises a description and/or one or more attributes of the at least one electronic commerce item retrieved from one or more servers corresponding to one or more vendors of the at least one electronic commerce item.

In step 806, the browsing activity data and the feature data are analyzed using one or more machine learning models comprising a deep neural forest network embedded with a C-LSTM network. The analyzing comprises removing stop words from the one or more searches, tokenizing most frequently used words of the one or more searches and/or stemming the most frequently used words of the one or more searches. The analyzing also comprises predicting keywords corresponding to the one or more attributes of the at least one electronic commerce item.

In step 808, at least one of a title and a description for the at least one electronic commerce item is generated based on the analysis. The generated title and/or the generated description are displayed on an interface for viewing by the at least one user.

The generating of the title and/or the description comprises performing text pattern modelling, text pattern matching and/or text generation. The generating of the title and/or the description also comprises generating a sequence of the predicted keywords and performing a grammar correction of the generated sequence.

The process may further comprise determining keywords most frequently used in the generated title and/or the generated description, creating a plurality of checkpoints for the most frequently used keywords, and training the one or more machine learning models using the created plurality of checkpoints.

According to one or more embodiment, the process also comprises collecting additional browsing activity data of at least one other user in connection with the at least one electronic commerce item, analyzing the additional browsing activity data and the feature data using the one or more machine learning models, and generating an additional title and/or an additional description for the at least one electronic commerce item based on the analysis of the additional browsing activity data and the feature data. The generated additional title and/or the generated additional description corresponding to the at least one other user are different from the generated title and/or the generated description corresponding to the at least one user.

The process may further comprise determining a first group of keywords used in the generated title and/or the generated description corresponding to the at least one user, determining a second group of keywords used in the generated additional title and/or the generated additional description corresponding to the at least one other user, generating a first word cloud corresponding to the first group of keywords, and generating a second word cloud corresponding to the second group of keywords.

It is to be appreciated that the FIG. 8 process and other features and functionality described above can be adapted for use with other types of information systems configured to execute title and description generation services in a title and description generation platform or other type of platform.

The particular processing operations and other system functionality described in conjunction with the flow diagram of FIG. 8 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a title and description generation platform as disclosed herein can provide a number of significant advantages relative to conventional arrangements. For example, unlike conventional techniques, the embodiments advantageously use machine learning techniques to provide automated generation of unique and meaningful product titles and descriptions tailored to a user's search criteria and historical data. The embodiments provide functionality for automatically generating more than one title and/or description for a product or service that is customized for different users. The embodiments use a machine learning model comprising a deep neural forest network with an embedded AC-LSTM model for title and/or description generation using text scraping, modelling and context mapping. Advantageously, as per a user's activity data, the model will tailor different product or service descriptions which will attract the user's attention when viewing search results in an e-commerce environment.

Advantageously, the embodiments save processing time and resources and storage capacity by using checkpoints to save data and generated titles and descriptions in a database. Such techniques are space efficient and facilitate retrieval of saved data for retraining machine learning models.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the title and description generation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a title and description generation platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
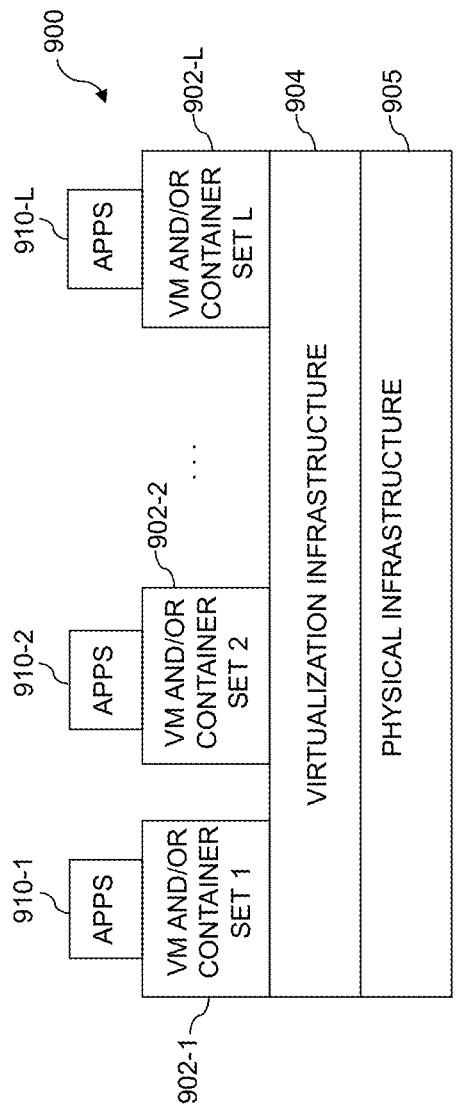

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-P, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the title and description generation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and title and description generation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    collecting browsing activity data of at least one user in connection with at least one electronic commerce item, wherein the browsing activity data comprises purchase status data for the at least one electronic commerce item, the purchase status data comprising information corresponding to whether the at least one electronic commerce item was added to a virtual shopping cart without being purchased;
    collecting feature data of the at least one electronic commerce item;
    analyzing the browsing activity data and the feature data using one or more machine learning models, wherein the analyzing comprises:
        inputting the browsing activity data into a first context encoder of a plurality of context encoders as a first plurality of sentences, wherein the first context encoder generates a first plurality of sentence representations based at least in part on the first plurality of sentences and extracts a first plurality of features from the first plurality of sentence representations, and wherein the first context encoder comprises a first plurality of convolutional neural networks;
        computing a first plurality of convoluted features for respective ones of the first plurality of features from the first plurality of sentence representations and merging the first plurality of convoluted features, wherein an output of the first context encoder is based at least in part on the merged first plurality of convoluted features;

inputting the feature data into a second context encoder of the plurality of context encoders as a second plurality of sentences, wherein the second context encoder generates a second plurality of sentence representations based at least in part on the second plurality of sentences and extracts a second plurality of features from the second plurality of sentence representations, and wherein the second context encoder comprises a second plurality of convolutional neural networks;

computing a second plurality of convoluted features for respective ones of the second plurality of features from the second plurality of sentence representations and merging the second plurality of convoluted features, wherein an output of the second context encoder is based at least in part on the merged second plurality of convoluted features;

computing respective hidden states based at least in part on the output of the first context encoder and the output of the second context encoder;

computing respective context representations by inputting the respective hidden states and computing respective attention weights; and merging the respective context representations to generate a combined output;

generating at least one of a title and a description for the at least one electronic commerce item based at least in part on the combined output;

training the one or more machine learning models with at least a first training dataset comprising historical user actions and one or more tags from features of a plurality of electronic commerce items;

determining a plurality of keywords used in the at least one of the generated title and the generated description;

creating a plurality of checkpoints for at least a subset of the used plurality of keywords;

re-training the one or more machine learning models with at least a second training dataset comprising the created plurality of checkpoints, the plurality of checkpoint comprising one or more weights for the one or more machine learning models, the one or more weights being saved based at least in part on whether accuracy of the one or more machine learning models increases; and displaying the at least one of the generated title and the generated description on an interface for viewing by the at least one user; and wherein the steps of the method are executed by a processing device operatively coupled to a memory.

2. The method of claim 1, wherein the browsing activity data and the feature data are collected from at least one of a cache of a user device of the at least one user and one or more servers corresponding to one or more vendors of the at least one electronic commerce item.

3. The method of claim 1, wherein the browsing activity data further comprises at least one of one or more navigation paths of the at least one user, one or more searches performed by the at least one user for the at least one electronic commerce item, one or more keywords used by the at least one user in the one or more searches.

4. The method of claim 3, wherein the at least one of the generated title and the generated description comprises the one or more keywords used by the at least one user in the one or more searches.

5. The method of claim 1, wherein the feature data comprises at least one of a description and one or more attributes of the at least one electronic commerce item retrieved from one or more servers corresponding to one or more vendors of the at least one electronic commerce item.

6. The method of claim 1, wherein the one or more machine learning models comprises a deep neural forest network.

7. The method of claim 6, wherein the deep neural forest network is embedded with a convolutional long short-term memory (C-LSTM) network.

8. The method of claim 1, wherein the generating of the at least one of the title and the description comprises performing at least one of text pattern modelling, text pattern matching and text generation.

9. The method of claim 1, wherein the browsing activity data further comprises one or more searches performed by the at least one user for the at least one electronic commerce item, and wherein the analyzing comprises at least one of removing stop words from the one or more searches, tokenizing most frequently used words of the one or more searches and stemming the most frequently used words of the one or more searches.

10. The method of claim 1, wherein the feature data comprises one or more attributes of the at least one electronic commerce item, wherein the analyzing comprises predicting keywords corresponding to the one or more attributes of the at least one electronic commerce item.

11. The method of claim 10, wherein the generating of at least one of the title and the description comprises:
generating a sequence of the predicted keywords; and
performing a grammar correction of the generated sequence.

12. The method according to claim 1, further comprising:
collecting additional browsing activity data of at least one other user in connection with the at least one electronic commerce item;
analyzing the additional browsing activity data and the feature data using the one or more machine learning models; and
generating at least one of an additional title and an additional description for the at least one electronic commerce item based on the analysis of the additional browsing activity data and the feature data;
wherein the at least one of the generated additional title and the generated additional description corresponding to the at least one other user are different from the at least one of the generated title and the generated description corresponding to the at least one user.

13. The method according to claim 12, further comprising:
determining a first group of keywords used in the at least one of the generated title and the generated description corresponding to the at least one user;
determining a second group of keywords used in the at least one of the generated additional title and the generated additional description corresponding to the at least one other user;
generating a first word cloud corresponding to the first group of keywords; and
generating a second word cloud corresponding to the second group of keywords.

14. An article of manufacture comprising a non-transitory processor-readable storage medium having stored therein program code of one or more software programs, wherein the program code when executed by at least one processing device causes said at least one processing device to perform the steps of:
- collecting browsing activity data of at least one user in connection with at least one electronic commerce item, wherein the browsing activity data comprises purchase status data for the at least one electronic commerce item, the purchase status data comprising information corresponding to whether the at least one electronic commerce item was added to a virtual shopping cart without being purchased;
- collecting feature data of the at least one electronic commerce item;
- analyzing the browsing activity data and the feature data using one or more machine learning models, wherein the analyzing comprises:
  - inputting the browsing activity data into a first context encoder of a plurality of context encoders as a first plurality of sentences, wherein the first context encoder generates a first plurality of sentence representations based at least in part on the first plurality of sentences and extracts a first plurality of features from the first plurality of sentence representations, and wherein the first context encoder comprises a first plurality of convolutional neural networks;
  - computing a first plurality of convoluted features for respective ones of the first plurality of features from the first plurality of sentence representations and merging the first plurality of convoluted features, wherein an output of the first context encoder is based at least in part on the merged first plurality of convoluted features;
  - inputting the feature data into a second context encoder of the plurality of context encoders as a second plurality of sentences, wherein the second context encoder generates a second plurality of sentence representations based at least in part on the second plurality of sentences and extracts a second plurality of features from the second plurality of sentence representations, and wherein the second context encoder comprises a second plurality of convolutional neural networks;
  - computing a second plurality of convoluted features for respective ones of the second plurality of features from the second plurality of sentence representations and merging the second plurality of convoluted features, wherein an output of the second context encoder is based at least in part on the merged second plurality of convoluted features;
  - computing respective hidden states based at least in part on the output of the first context encoder and the output of the second context encoder;
  - computing respective context representations by inputting the respective hidden states and computing respective attention weights; and
  - merging the respective context representations to generate a combined output;
- generating at least one of a title and a description for the at least one electronic commerce item based at least in part on the combined output;
- training the one or more machine learning models with at least a first training dataset comprising historical user actions and one or more tags from features of a plurality of electronic commerce items;
- determining a plurality of keywords used in the at least one of the generated title and the generated description;
- creating a plurality of checkpoints for at least a subset of the used plurality of keywords;
- re-training the one or more machine learning models with at least a second training dataset comprising the created plurality of checkpoints,
- the plurality of checkpoints comprising one or more weights for the one or more machine learning models, the one or more weights being saved based at least in part on whether accuracy of the one or more machine learning models increases; and
- displaying the at least one of the generated title and the generated description on an interface for viewing by the at least one user.

15. The article of manufacture of claim 14, wherein the program code further causes said at least one processing device to perform the steps of:
- collecting additional browsing activity data of at least one other user in connection with the at least one electronic commerce item;
- analyzing the additional browsing activity data and the feature data using the one or more machine learning models; and
- generating at least one of an additional title and an additional description for the at least one electronic commerce item based on the analysis of the additional browsing activity data and the feature data;
- wherein the at least one of the generated additional title and the generated additional description corresponding to the at least one other user are different from the at least one of the generated title and the generated description corresponding to the at least one user.

16. The article of manufacture of claim 15, wherein the program code further causes said at least one processing device to perform the steps of:
- determining a first group of keywords used in the at least one of the generated title and the generated description corresponding to the at least one user;
- determining a second group of keywords used in the at least one of the generated additional title and the generated additional description corresponding to the at least one other user;
- generating a first word cloud corresponding to the first group of keywords; and
- generating a second word cloud corresponding to the second group of keywords.

17. The article of manufacture of claim 14, wherein the feature data comprises one or more attributes of the at least one electronic commerce item, wherein the analyzing comprises predicting keywords corresponding to the one or more attributes of the at least one electronic commerce item.

18. The article of manufacture of claim 17, wherein the generating of at least one of the title and the description comprises:
- generating a sequence of the predicted keywords; and
- performing a grammar correction of the generated sequence.

19. The article of manufacture of claim 14, wherein the browsing activity data and the feature data are collected from at least one of a cache of a user device of the at least one user and one or more servers corresponding to one or more vendors of the at least one electronic commerce item.

20. The article of manufacture of claim 14, wherein the generating of the at least one of the title and the description comprises performing at least one of text pattern modelling, text pattern matching and text generation.

\* \* \* \* \*